United States Patent
Satoor et al.

(10) Patent No.: US 11,630,848 B2
(45) Date of Patent: Apr. 18, 2023

(54) MANAGING HYPERCUBE DATA STRUCTURES

(71) Applicant: International Business Machines Corporation, Armonk, NY (US)

(72) Inventors: Aparna Ramesh Satoor, Toronto (CA); Victoria Aboud, Toronto (CA); Ilse M. Breedvelt-Schouten, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 16/577,049

(22) Filed: Sep. 20, 2019

(65) Prior Publication Data

US 2021/0089558 A1    Mar. 25, 2021

(51) Int. Cl.
  *G06F 16/28*    (2019.01)
  *G06F 16/22*    (2019.01)
  *G06F 16/2457*    (2019.01)
  *G06F 16/2458*    (2019.01)

(52) U.S. Cl.
  CPC .......... *G06F 16/283* (2019.01); *G06F 16/221* (2019.01); *G06F 16/2264* (2019.01); *G06F 16/2457* (2019.01); *G06F 16/2458* (2019.01)

(58) Field of Classification Search
  CPC .............. G06F 16/283; G06F 16/2264; G06F 16/2457; G06F 16/2458; G06F 16/221; G06F 16/2465
  See application file for complete search history.

(56) References Cited

U.S. PATENT DOCUMENTS

| | | | |
|---|---|---|---|
| 6,714,940 B2 | 3/2004 | Kelkar | |
| 8,825,649 B2 | 9/2014 | Heimendinger | |
| 9,432,298 B1* | 8/2016 | Smith | H04L 49/9057 |
| 2002/0087633 A1* | 7/2002 | Nelson | H04L 67/306 |
| | | | 709/204 |
| 2005/0289455 A1* | 12/2005 | Hays | G06F 40/18 |
| | | | 715/228 |
| 2011/0041089 A1* | 2/2011 | Lam | G06Q 10/06 |
| | | | 715/771 |
| 2012/0023101 A1* | 1/2012 | Heimendinger | G06F 16/337 |
| | | | 707/804 |
| 2013/0159307 A1* | 6/2013 | Wolge | G06F 16/26 |
| | | | 707/737 |

(Continued)

OTHER PUBLICATIONS

Shahram Latifi, "Hypercube-based Topologies with Incremental Link Redundancy", pp. 1-152 (Year: 1989).*

(Continued)

*Primary Examiner* — Mark D Featherstone
*Assistant Examiner* — Kweku William Halm
(74) *Attorney, Agent, or Firm* — Brian D. Welle (57) ABSTRACT

Aspects of this disclosure relate to managing hypercubes. A plurality of variables may be received from a user. Features of these variables are identified. A new hypercube data structure is generated. The hypercube is generated by assigning, using the features, a first set of variables of the plurality of variables as one or more row variables of the hypercube, assigning a second set of variables of the plurality of variables as one or more column variables of the hypercube, and assigning a variable of the plurality of variables as a nested variable of the hypercube.

20 Claims, 5 Drawing Sheets

(56) References Cited

U.S. PATENT DOCUMENTS

| | | | | |
|---|---|---|---|---|
| 2015/0178407 | A1* | 6/2015 | Hughes | G06F 16/24534 707/768 |
| 2015/0310082 | A1* | 10/2015 | Han | G06F 16/254 707/602 |
| 2016/0092499 | A1* | 3/2016 | Leigh | G06F 8/34 707/740 |
| 2019/0332610 | A1* | 10/2019 | Krishna | G06F 16/2457 |
| 2020/0379609 | A1* | 12/2020 | Jacob | G06F 3/0482 |

OTHER PUBLICATIONS

Sarabi et al., "A comprehensive approach to logic synthesis and physical design for two-dimensional logic arrays" DAC '94: Proceedings of the 31st annual Design Automation Conference Jun. 1994 pp. 321-326 https://doi.org/10.1145/196244.196398 (Year: 1994).*

"Create a Cube Using a Data Source View," Microsoft Docs, May 1, 2018, 6 pages. <https://docs.microsoft.com/en-us/sql/analysis-services/multidimensional-models/create-a-cube-using-a-data-source-view?view=sql-server-2017>.

"Creating a Cube Using the PowerOLAP Cube Modeler," OLAP. com, accessed Jul. 1, 2019, 4 pages. <http://olap.com/learn-bi-olap/tutorials/olap-cube-modeling-create-a-cube/>.

"Creating Modules: Adding Dimensions and Line Items," Anaplan Community, accessed Jul. 1, 2019, 6 pages. <https://community.anaplan.com/t5/Introduction-to-Model-Building/Creating-Modules-Adding-Dimensions-and-Line-Items/ta-p/32173>.

"Learning to rank," Wikipedia, accessed Jul. 1, 2019, 14 pages. <https://en.m.wikipedia.org/wiki/Learning_to_rank>.

"Optimizing the Order of Dimensions in a Cube," IBM Knowledge Center, accessed Jul. 1, 2019, 2 pages. <https://www.ibm.com/support/knowledgecenter/en/SS9RXT_10.2.2/com.ibm.swg.ba.cognos.tm1_dg_dvlpr.10.2.2.doc/t_optimizingtheorderofdimensionsinacube_n81292.html>.

Mohri, "Foundations of Machine Learning Ranking," Courant Institute and Google Research, accessed Jul. 1, 2019, 47 pages. <https://cs.nyu.edu/~mohri/mls/ml_ranking.pdf>.

Sun, "Knowledge-driven AI features in a self-service analytics platform," IBM developer, Apr. 9, 2019, 12 pages. <https://developer.ibm.com/articles/understand-new-ai-features-in-cognos-analytics-111/>.

* cited by examiner

|  | ⊖ Totals of Products | | | | ⊕ Camping Equi.... | | | ⊕ Personal Acc.... | |
| --- | --- | --- | --- | --- | --- | --- | --- | --- | --- |
|  | Total | ⊕ 2016 | ⊕ 2017 | ⊕ 2018 | Total | ⊕ 2016 | Total | ⊕ 2016 |
| ⊖ Total of regions | 14,877,604 | 0 | 0 | 14,877,604 | 8,275,657 | 0 | 300,000 | 0 |
| ⊖ Eastern Region | 4,653,640 | 0 | 0 | 4,653,640 | 2,595,986 | 0 | 225,000 | 0 |
| Massachusetts | 1,696,301 | 0 | 0 | 1,696,301 | 956,156 | 0 | 75,000 | 0 |
| Maryland | 1,436,233 | 0 | 0 | 1,436,233 | 797,037 | 0 | 21,000 | 0 |
| Connecticut | 1,521,106 | 0 | 0 | 1,521,106 | 842,753 | 0 | 54,000 | 0 |
| ⊖ Central Region | 6,133,528 | 0 | 0 | 6,133,528 | 3,393,967 | 0 | 62,000 | 0 |
| Michigan | 1,762,759 | 0 | 0 | 1,762,759 | 964,998 | 0 | 10,5000 | 0 |
| Illinois | 1,567,436 | 0 | 0 | 1,567,436 | 886,147 | 0 | 0 | 0 |
| Wisconsin | 1,518,976 | 0 | 0 | 1,518,976 | 842,430 | 0 | 7,500 | 0 |
| Minnesota | 1,284,355 | 0 | 0 | 1,284,355 | 700,391 | 0 | 18,000 | 0 |
| ⊕ Western Region | 4,090,435 | 0 | 0 | 4,090,435 | 2,285,702 | 0 | 36,000 | 0 |

FIG. 2

| | Current Plan | Percentage of T... | ⊕ Previous Plan | Variance | % Variance |
|---|---|---|---|---|---|
| ⊖ Totals of Products | 1,506,704,647 | 100% | 1,491,827,043 | 14,877,604 | 1.00% |
| ⊖ Camping Equipm... | 901,400,288 | 59.83% | 893,124,630 | 8,275,657 | 0.93% |
| Tents | 34,644,796 | 2.30% | 34,372,800 | 292,176 | 0.85% |
| Sleeping bags | 35,745,355 | 2.37% | 35,298,226 | 447,129 | 1.27% |
| Packs | 30,524,176 | 2.03% | 30,137,814 | 386,362 | 1.28% |
| Lanterns | 92,315,578 | 6.13% | 91,135,558 | 1,180,020 | 1.29% |
| Cooking Gear | 706,965,553 | 46.92% | 700,995,713 | 5,969,971 | 0.85% |
| Air Mattress | 1,184,649 | 0.08% | 1,184,649 | 0 | 1.15% |
| ⊖ Personal Acces... | 393,045,786 | 26.09% | 388,562,713 | 4,483,073 | 1.08% |
| Watches | 6,461,505 | 0.43% | 6,392,503 | 69,001 | 1.06% |
| Eyewear | 258,736,777 | 17.17% | 256,029,740 | 27,709,037 | 1.30% |

MANAGING HYPERCUBE DATA STRUCTURES

BACKGROUND

Computer data structures are getting increasingly robust as users discover more nuanced ways to view and analyze data. One such data structure includes organizing datasets into a multi-dimensional array referred to as an online analytical processing (OLAP) cube, or hypercube. Hypercubes include a plurality of two-dimensional array of cells (similar to a spreadsheet) that are stacked on top of each other and/or nested into each other, such that cells from one layer are related to aligned cells on an adjacent layer. For example, each layer may relate to a value or datapoint (e.g., 2018) of a variable (e.g., a year) that changes while other variables of the given layers remain static (e.g., sales of products across twelve months of a year) throughout the hypercube, such that an analyst may analyze how a complex system changes when compared against that variable. For example, variables may include location, time, products, price, or the like.

SUMMARY

Aspects of the present disclosure relate to a method, system, and computer program product relating to managing hypercubes. For example, the method includes receiving a plurality of variables from a user. The method also includes identifying features of the plurality of variables. The method includes generating a new hypercube data structure. The hypercube is generated by assigning, using the features, a first set of variables of the plurality of variables as one or more row variables of the hypercube, assigning a second set of variables of the plurality of variables as one or more column variables of the hypercube, and assigning a variable of the plurality of variables as a nested variable of the hypercube. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing hypercubes, while more particular aspects of the present disclosure relate to autonomously generating a hypercube in response to a user providing the variables of the hypercube. While the present disclosure is not necessarily limited to such applications, various aspects of the disclosure may be appreciated through a discussion of various examples using this context.

In conventional systems, a user may initially list all of the variables of a hypercube. As described herein, a variable may include a predetermined set of data all relating to a single thing, such as a set of data that is entered into a spreadsheet or the like. In some examples, the data of the variable may be ordered, such that there is a known order and/or place (e.g., first, second, third) for each data point within the data set. Additionally, or alternatively, the data may be structured such that some or each data point of the variable is related to one or more data points of other variables. For example, where the data is stored on a spreadsheet, each row and each column of the spreadsheet may relate to unique variables, such that any given data point in a given cell relates to both the variable of the column of the cell and the row of the cell.

In these conventional systems, upon listing all variables the user may be required to personally select a position within the hypercube for each variable. It may take a substantial amount of time for a user to uniquely and logically place each of these variables, given the variations possible in a hypercube with nested variables. Further, in some examples, there may be a relatively long feedback loop for users evaluating variable placement when using conventional systems. For example, it may be difficult or impossible for a user to determine if variables were well positioned until many operations are executed, such as a first operation of the user positioning all variables, a second operation of the system generates the hypercube, and one or more data operations (e.g., expanding variables, moving into the hypercube, rotating the hypercube, etc.) are executed on the hypercube.

Aspects of the disclosure are related to autonomously generating a hypercube upon receiving the set of variables from the user. A computing system that includes a processor that executes instructions stored on a memory (this computing system hereinafter referred to as a controller) may generate the hypercube without a user providing instructions on where to place the provided variables within the hypercube. The controller may reference stored data of previous hypercubes to determine how to arrange variables on the hypercube. For example, the controller may identify features of the variables, such as values or datapoints of the variables (e.g., prices, numbers, dates, names, etc.), ranges of these variables, titles of the variables, descriptions or metadata of these variables, an amount of data points assigned to the variables, or the like.

The controller may compare each variable against a stored set of historical variables used in historical hypercubes to determine a plurality of weighted grades as to where the variables may be located. By evaluating all of the weighted grades against each other (e.g., to maximize an average grade of the variables), the controller may autonomously organize and generate a hypercube for a user. By configuring the controller to identify features of each variable and compare these features to historical features of historical hypercubes, aspects of this disclosure may be configured to autonomously structure a hypercube in a manner that coherently presents the data of the variables.

Figure 1A:
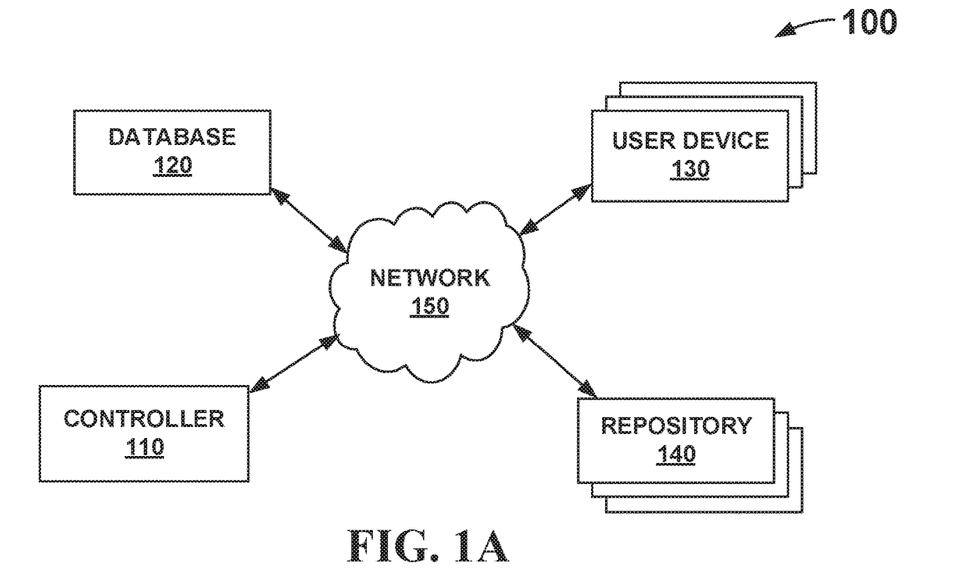
FIG. 1A depicts a conceptual diagram of an example system in which a controller may manage the generation of hypercubes.

For example, FIG. 1A depicts system 100 that includes controller 110 that is configured to manage hypercubes. Controller 110 may include a computing device, such as computing device 200 of FIG. 4 that includes a processor communicatively coupled to a memory that includes instructions that, when executed by the processor, causes controller 110 to execute one or more operations described below. Controller 110 may receive requests, commands, data, or the like for hypercubes from user's user devices 130. User devices 130 may include computing devices (e.g., devices similar to computing device 200 of FIG. 4) such as laptops, desktops, mobile phones, tablets, or the like.

A user may provide or select a set of variables for the generation of a hypercube. Controller 110 may receive the set of variables from the user as sent by user device 130 over network 150. Network 150 may include a computing network over which computing messages may be sent and/or received. For example, network 150 may include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, database 120, user devices 130, and/or repositories 140) may receive messages and/or instructions from and/or through network 150 and forward the messages and/or instructions for storage or execution or the like to a respective memory or processor of the respective computing/processing device.

Though network 150 is depicted as a single entity in FIG. 1A for purposes of illustration, in other examples network 150 may include a plurality of private or public networks. For example, controller 110 may store data related to hypercubes, variables, users, or the like on database 120, such that controller 110 and database 120 may communicate together over a private LAN of network 150. For another example, user device 130 may send variables to controller 110 by first coupling to a private WLAN of network 150. Additionally, controller 110 may gather data related to users from repositories 140 over a public portion of network 150 using the Internet.

As noted above, controller 110 may receive a plurality of variables from a user. Each variable may be related to an array of data of that variable. For example, the variable may be "year," and the array may include a set of revenues that all occurred in that year. Variables may cross relate to each other in one or more ways. For example, another variable may be "online sales," with an associated array detailing a set of revenues for different calendar years. Further, a third variable may be "camping gear," with a first associated array that details revenue across a plurality of years and a second associated array that details sales across a plurality of interfaces (e.g., including an online sales interface). As such, some or all of the variables may be associated with one or more arrays of data that relate to two or more other variables.

In some examples, arrays of data or the like may be stored in databases 120. Databases 120 may be computing devices (e.g., similar to computing device 200 of FIG. 4) that are configured to store data, such as a server or a rack of servers or the like. Though database 120 is depicted as a separate device from controller 110 for the sake of illustration, in other examples database 120 may be integrated into controller 110 (e.g., similar to the depiction of FIG. 4). In response to receiving a titled variable from user device 130, controller 110 may identify one or more associated arrays of data of that titled variable as stored on database 120.

Once controller 110 has received the full set of variables, controller 110 may identify features of each of these variables. In some examples, controller 110 may identify a title of a variable as a feature of those variables. For example, a feature of a variable "2017" may only include the numbers "2017," such that only historical variables that included numbers that were similar to 2017 (e.g., where 2016 and 2018 would be identified as similar) would be identified as correlating with this variable. In other examples, controller 110 may further analyze the variables to identify secondary features. For example, controller 110 may identify data points associated with the variable as being features of the variable (e.g., such that a feature of variable "2017" may include a plurality of dollar amounts and a plurality of products).

For another example, controller 110 may identify metadata such as a description or documentation that is associated with the variable. For example, variables as provided by the user may be associated with documentation on the variables as stored in database 120 and/or repository 140, such as a variable that includes a product name and documentation on repository 140 that describes that product. For another example, controller 110 may analyze the characters of the identified variable to identify features of the variable. Controller 110 may use natural language processing (NLP) techniques described herein to analyze documentation and/or characters or the like of variables to identify features of the variable. Once features are identified, controller 110 may then gather data on historical variables that share these features and/or have similar features.

In response to receiving the variables, controller 110 may gather historical data relating to features of the variables. For example, controller 110 may gather data on how variables that shared features of the received set of variables were previously displayed in hypercubes. For example, where a received set of variables relates to a calendar year, controller 110 may gather examples of hypercubes that utilized one or more calendar year variables. Controller 110 may identify such information as to whether the variables were in rows of the hypercube, columns of the hypercube, whether the variables were nested variables that were part of the "depth" of the hypercube, whether the variables were shown or hidden where variables could be part of an "exploder" list, or the like. In some examples, controller 110 may further gather relationships of different kinds of variables, such as whether the inclusion of a "time" variable impacted the use or location or the like of a "price" variable, a "product" variable, a "department" variable, or the like.

Once controller 110 gathers historical data on variables associated with the features of the provided variables, controller 110 may determine weighted grades for different locations for each variable. Each specific assigned location on a hypercube may be mutually exclusive with other locations, such that, e.g., it is impossible to assign two variables to a single column, or assign a single variable to two columns. As such, controller 110 may analyze how assigning each variable both impacts the weighted grade of that variable as well as impacts the weighted grade of where other variables may be located given that assignment.

Controller 110 may determine that a weighted grade of an assignment of a given variable is relatively higher (where higher grades are better as used herein) when the provided assignment has a relatively stronger correlation with a historical usage of variables with shared features of that given variable. Some embodiments of this might include controller 110 determining that a feature of a certain variable includes a general category of this variable (e.g., such as a category of "time" or "cost" or "make and model"), such that the certain variable has a very high correlation with other variables of this same category. For example, if a variable has a feature of a "calendar year" category, and historical variables with a feature of "calendar year" categories are assigned to columns of a hypercube 70% of the time, controller 110 may determine that the variable with the calendar year category has a strong correlation and therein a high weighted grade with columns. Similarly, where controller 110 determines that variables with categories of "calendar year" and "sequential years" are present (e.g., such that one variable is 2016, another variable is 2017, another is 2018, etc.), controller 110 may determine that assigning the variables to columns such that the calendar years tick up or down on adjacent columns has a high correlation to historical usage.

In some examples, such correlations may be high enough that controller 110 may identify these as rules or guidelines. For example, controller 110 may identify a rule that an initial assignment includes assigning one or more identified year variables to columns, after which other weighted grades are determined. In other examples, controller 110 may utilize such rules when identifying that certain combinations of variables are present (e.g., when variables X, Y, and Z with predetermined features, A, B, and C are identified, controller 110 starts a hypercube generation process by assigning variable X with feature A to the first column, after which subsequent assignments are determined).

The amount of correlation that is determined to be high (and therein result in a good weighted grade) may vary depending upon the implementation or the historical user. For example, controller 110 may be configured to provide a higher weighted grade with strong correlations to hypercubes as generated by a predetermined set of users (e.g., users that have been identified as particularly skilled at generating hypercubes). Controller 110 may reference a predetermined list of such users, such that a strong correlation with a variable assignment of a historical hypercube that was generated or managed by these users results in a higher weighted grade. Alternatively, or additionally, controller 110 may identify the current user that has provided the instant set of variables, therein providing higher weighted grades to variables that correlate with a historical usage of the current user. Controller 110 may gather such data on users from one or more repositories 140, which may include company websites that include employee positions or the like. Alternatively, controller 110 may store or otherwise access such user data on database 120. Other examples of using different criteria to evaluate correlations are also possible.

Figure 1B:
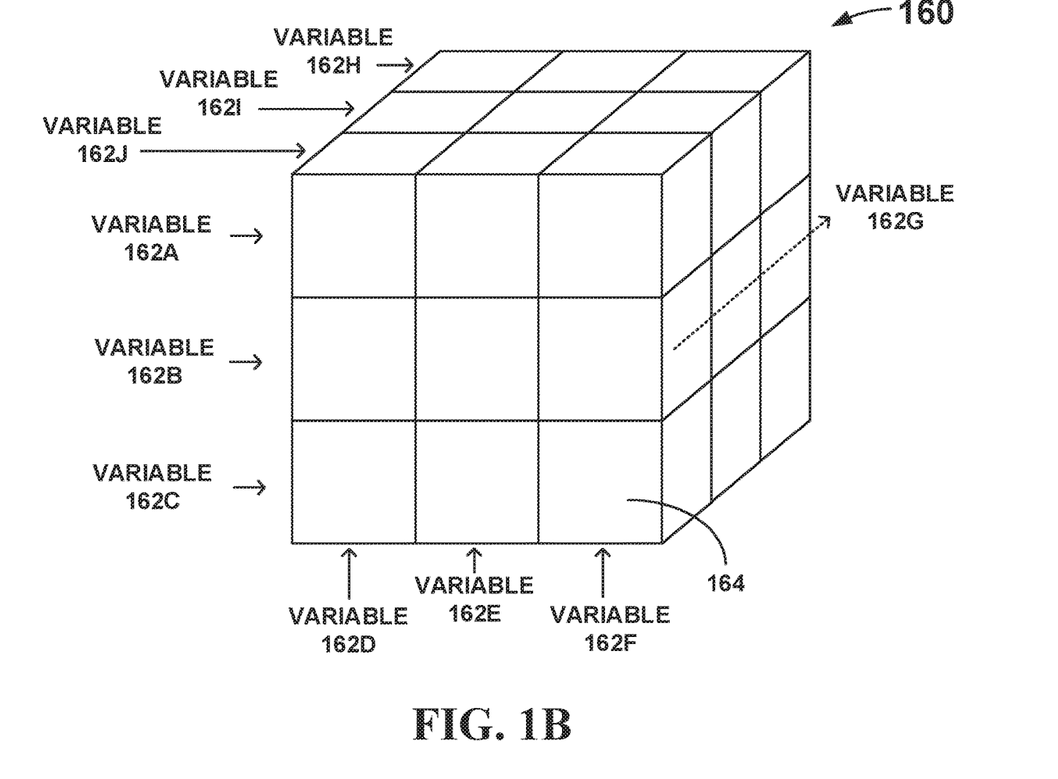
FIG. 1B depicts an example hypercube with an example set of variables.

Once weighted grades are determined, controller 110 may assign each variable to a hypercube for presentation to a user. Hypercubes may include row variables, column variables, and nested variables. For example, FIG. 1B depicts a conceptual example of hypercube 160 that stores a plurality of variables 162A-162J (collectively, "variables 162") within a plurality of cells 164. Though hypercube 160 is depicted as a three-dimensional cube in FIG. 1B for purposes of illustration, it is to be understood that a user may typically or always be presented with a single two dimensional "page" of hypercube at any given time, where the page includes a plurality of rows and columns (e.g., similar to pages 170A, 170B of FIGS. 2 and 3).

As depicted, each of variables 162 may be assigned to a column or row or assigned as a nested variable in a particular dimension. In this way, a user may have a single data structure that may be dug in to or rotated or the like to provide different sets of data. For example, variables 162A-162C may relate to three different products, while variables 162D-162F may relate to three trimesters of a year. Further, cells 164 at which variables 162A-162F of hypercube 160 intersect may include revenue of respective products of variables 162A-162C during respective trimesters of variables 162D-162F.

At the same time, hypercube 160 includes nested variable 162G. Nested variable 162G may be related to another variable 162A-162F of hypercube and may have related arrays of datapoints with these variables 162A-162F. For example, nested variable 162G may relate to years, such that a user may request an operation to view a page within hypercube 160 to view cell 164 data points of product variables 162A-162C and trimester variables 162D-162F across a different year.

Similarly, in some examples hypercube 160 may be rotated to view different combinations of nested variables. For example, hypercube may include nested variables 162H-162J that are related to types of sales (e.g., online, in person, over telephone), such that a user may rotate hypercube 160 to view a page of hypercube 160 that is square to a top surface of hypercube to view cells 164 that compare trimesters 162D-162F as compared to type of sales (e.g., where trimester variables 162A-162B wrap around hypercube 160). Other arrangements of nesting variables 162 for different views of cells 164 of hypercube 160 that are consistent with this disclosure also possible in other examples.

Controller 110 may present such hypercubes 160 to a user such that the user may view hypercubes 160 at user device 130. In some examples, controller 110 may initially present hypercubes 160 to a user with a view that is similar to that depicted in FIG. 1B, so that a user may see many or all nested variables (as well as a nature of this nesting) all at once. In other examples, controller 110 may present one or more pages to a user, similar to pages depicted in FIGS. 2 and 3.

In some examples, controller 110 may identify that few or no historical variables match the provided variables with a full weighted grade that satisfies a threshold (e.g., such that at least one weighted grade fails to satisfy a threshold, and/or that an average grade of the weighted grades fails to satisfy a threshold, or the like). In such examples, controller 110 may request that the user generate hypercube 160, in response to which controller 110 may store this hypercube 160 in order to have a set of historical variables with which to compare going forward. Controller 110 may detect the final hypercube 160 as created by the user, saving the final hypercube 160 and the associated variables 162 in database 120. In this way, controller 110 may become better at generating hypercubes over time.

In certain examples, even when controller 110 is not able to generate hypercube 160 that satisfies a threshold as described above, controller 110 may still provide a few template hypercubes 160 to the user with which the user may work off of. Controller 110 may generate these hypercubes 160 according to a set of general rules (e.g., assigning time periods to columns) and/or according to any correlations that controller 110 identifies, even if these correlations do not satisfy thresholds as described herein. In some examples, controller 110 may randomly fill in other variables across a plurality of template hypercubes, so that a user may evaluate each of the templates before choosing one to update and finalize. Controller 110 may detect operations executed by the user in finalizing the hypercube, saving the final hypercube 160 in database 120 for future reference.

In some examples, controller 110 may further notice the order in which a user deletes provided hypercube templates to become better over time at providing template hypercubes (e.g., where controller 110 provides five templates, from which a user deletes two templates within seconds, deletes a third template after a minute, and chooses one of the two remaining templates after a subsequent minute). For example, where controller 110 identifies an order in which a user deletes offered templates, controller 110 may identify assignments that a user dismisses relatively quickly as having poor correlations (e.g., poor assigned weighted grades) and update a learning algorithm accordingly. In this way, controller 110 may expedite a process of hypercube 160 generation (and further improve on such expediting over time) even when controller 110 is unable to autonomously generate a complete hypercube with assignments whose weighted grades satisfy a threshold.

In some examples, controller 110 may determine that more than one set of assignments satisfies predetermined thresholds, in response to which, controller 110 may present a plurality of hypercubes 160 to a user that depict a plurality of different options for variable 162 assignment. For example, FIGS. 2 and 3 depict two pages 170A, 170B (collectively, "pages 170") that arrange variables 172A-172F (collectively, "variables 172") differently, where variables 172A-172D are depicted in FIG. 2 and variables 172A, 172B, 172E, 172F are depicted in FIG. 3.

Figure 2:
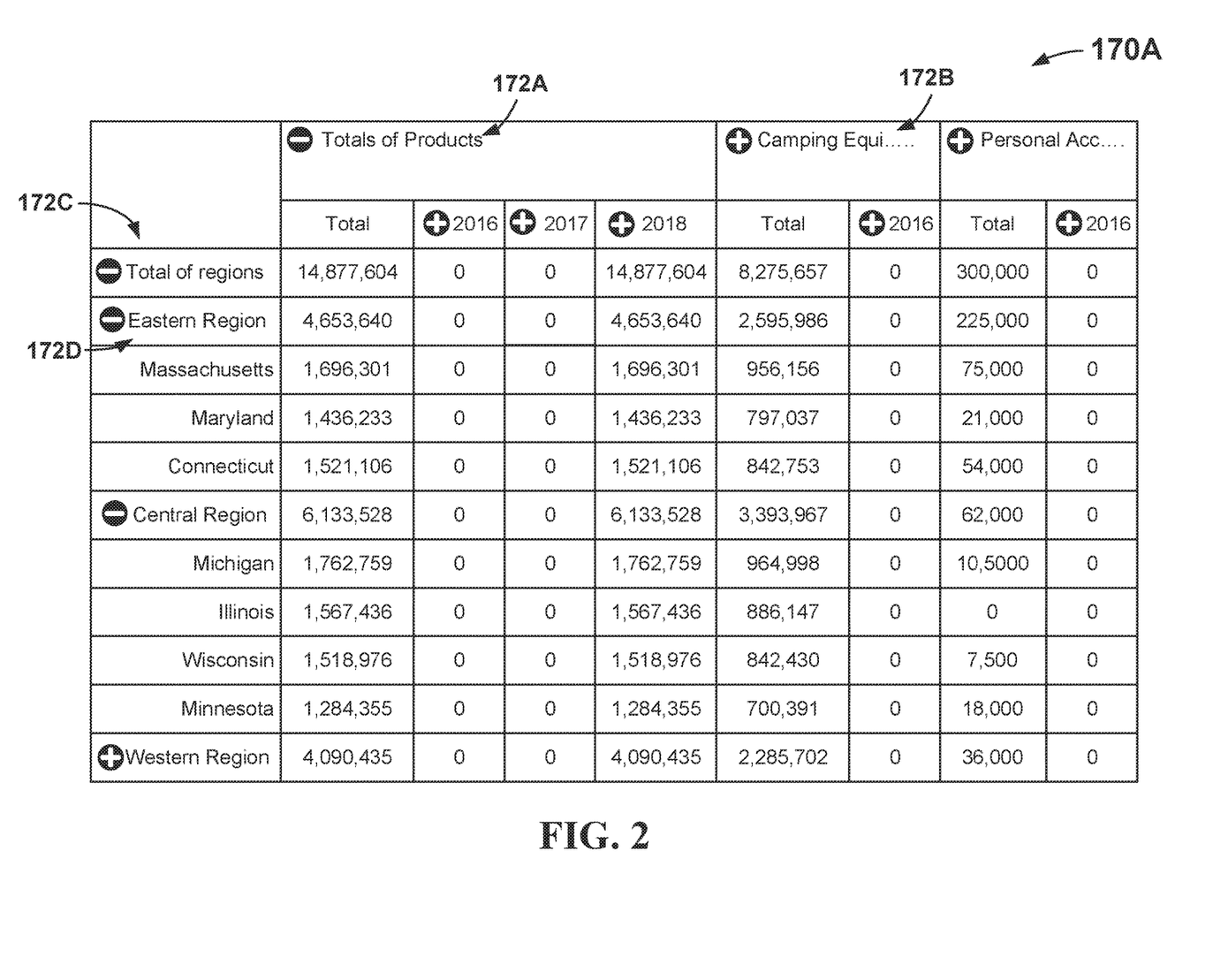
FIG. 2 depicts an example page of a hypercube generated from a set of variables with a first alignment.
Figure 3:
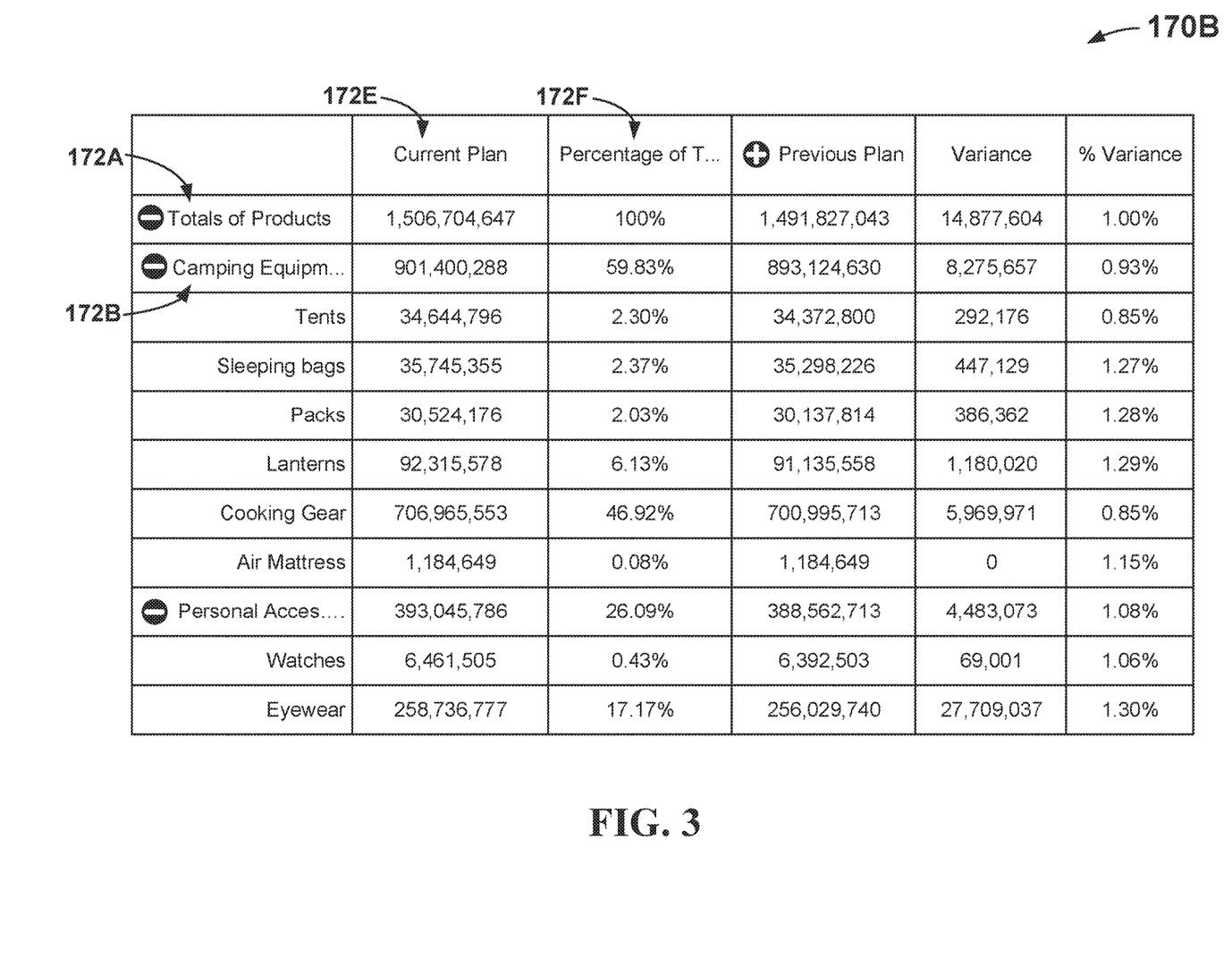
FIG. 3 depicts an example page of a hypercube generated from the set of variables of FIG. 2 with a second alignment.

For example, as depicted in FIG. 2, locations variables 172 are assigned to rows of page 170A, and time-related product variables 172 are assigned to columns. As depicted, in some examples controller 110 may determine to expand or explode some variables 172 and shrink or collapse other variables 172. Exploded variables 172 are depicted as variables 172 that are adjacent to a black dot that includes a "−" sign, and collapsed variables 172 are depicted as variables 172 that are adjacent to a black circle that includes a "+" sign. Users may expand a collapsed variable 172 to view more nested variables 172 within the variable 172 (e.g., such as a "tent" variable 172 or an "air mattress" variable 172 within the "camping equi[pment]" variable 172B. Controller 110 may determine that variables 172 are explodable as a result of those variables being correlated with historical exploded variables of database 120. Controller 110 may determine to collapse or explode an explodable variable 172 based on whether or not historical explodable variables were predominantly exploded or collapsed when viewed by historical users. In this way, controller 110 may identify variables 172 as explodable or collapsible when analyzing features of the variables 172, and moreover controller 110 may explode or collapse these variables as generated for the user.

In some examples, controller 110 may change a size of one or more cells of the hypercube as generated depending on features of one or more variables. For example, controller 110 may determine a row height and/or a column width for one or more columns and/or rows of a generated hypercube for respective variables 172 based on how features of these variables 172 indicate how these variables 172 are historically presented. Controller 110 may determine to determine a row height and/or a column width such that data values and/or a full text name of respective variables 172 fit within the rows and/or columns. For example, looking to variable 172C, a row height and column width fit the name of the variable (and the data of the variable) such that all are entirely visible while minimal extra space is provided.

In other examples, controller 110 may determine that features of respective variables 172 may indicate that relatively more column width and/or row height than is necessary to fit the name and/or data points of respective variables 172 may be appropriate. For example, looking to variable 172A of FIG. 2, there is substantially more row height and column width than are needed to fit the text and data points of variable 172A. Controller 110 may determine to generate a hypercube with cells that define more row height and/or column width for respective variables 172 that have features that indicate that these variables 172 are relatively more prominent or important and/or have more than a threshold number of sub-variables 172 associated with the respective variable (e.g., variables such as "Total, 2016, 2017, and 2018 that are nested within Totals of Products variable 172A).

Alternatively, in some examples controller 110 may determine to generate a hypercube with a row height and/or column width for respective variables 172 that is smaller than is necessary to fully display all text of these variables 172 and/or all data points of these variables 172. For example, as depicted in FIG. 2, variable 172B has a column width that does not fit all text of variable 172B. Controller 110 may generate a hypercube with such a row height and/or column width for variables 172 with a feature of a name over a certain threshold length (e.g., over 10 characters). Alternatively, in some example controller 110 may determine that variables 172 with a feature of an easy-to-interpret shortened name (e.g., where it may be relatively easy to understand "camping equipment" from "camping equi . . .") are associated with a column width that is smaller than the full text of these variables 172. Alternatively, controller 110 may determine that variables with a feature of a difficult and/or impossible to interpret shortened name (e.g., where it may be difficult to understand what is meant by a shortened version of a chemical name such as poly(methyl methacrylate) for many users) are associated with a column width that fits a full length of the names of these variables 172. Other examples of features of variables that may cause controller 110 to generate a hypercube with relatively greater or smaller row heights and/or column widths are also possible.

FIG. 3 depicts an alternate page 170B for an alternate hypercube of the provided variables. As depicted, page 170B includes product sales variables 172 during a given time span in rows and includes variance variables 172 in columns, such that new variables 172 are in columns and a different organization of variables 172 that used to be in columns are now in rows. In this example, controller 110 may nest time variables 172 and/or location variables 172 in different manners within this hypercube, such that a user may dig into the hypercube or rotate the hypercube or the like to view different options.

A user may view both pages 170 of the two generated hypercubes as generated by controller 110 before selecting one. In some examples, controller 110 may modify a correlation between the selected variables and historical variables in response to the selection, where the respective page 170 that was selected has a correlation increase and the respective page 170 that was not selected has a correlation decrease. In this way, controller 110 may improve over time at generating hypercubes.

Figure 4:
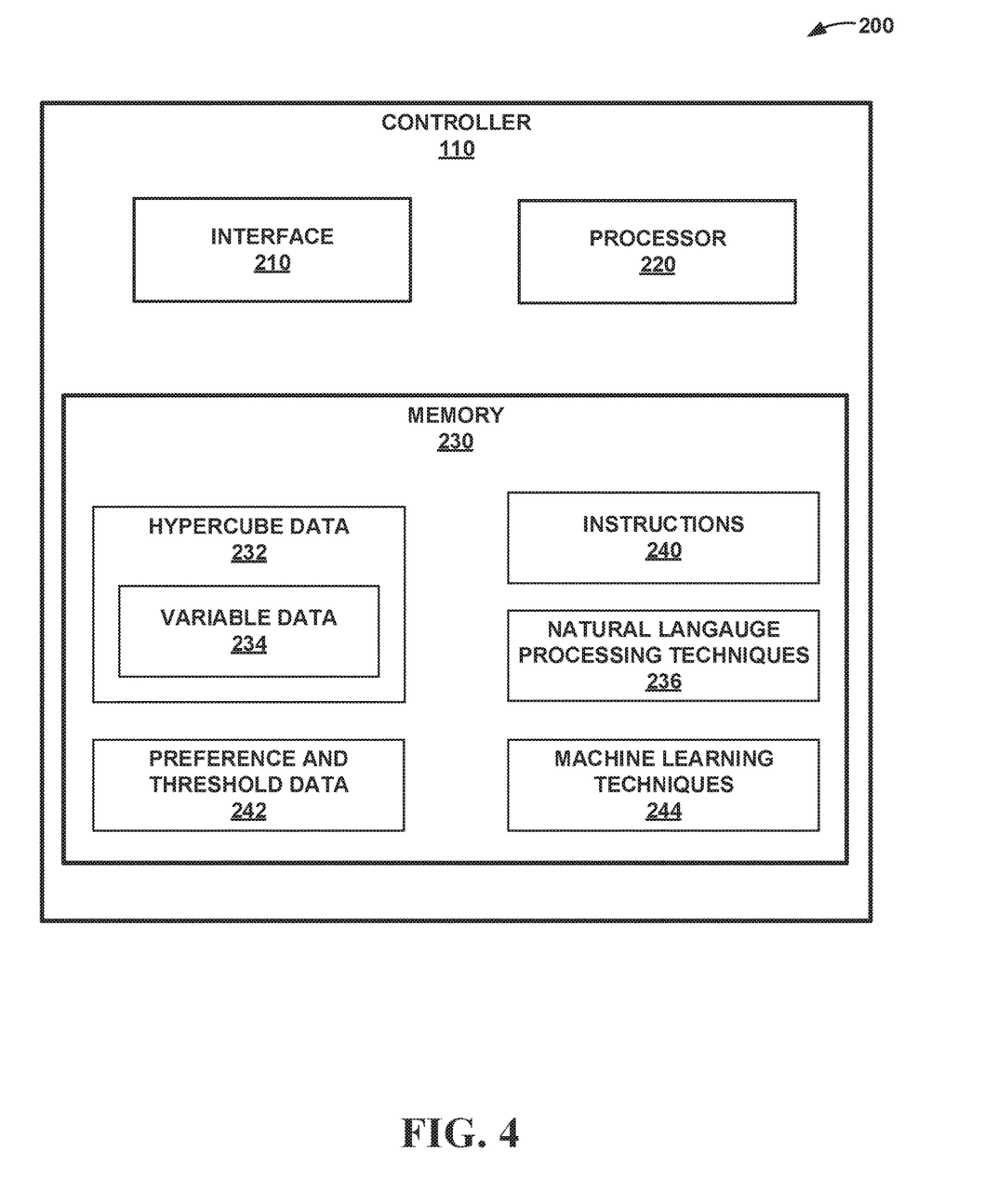
FIG. 4 depicts a conceptual box diagram of a computing system that may be configured to manage the generation of hypercubes.

As described above, controller 110 may include computing device 200 with a processor configured to execute instructions stored on a memory to execute the techniques described herein. For example, FIG. 4 is a conceptual box diagram of such computing device 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with database 120, user devices 130, repositories 140, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to manage the generation of hypercubes. Controller 110 may utilize processor 220 to manage hypercubes. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage hypercubes.

Processor 220 may manage the generation of hypercubes according to instructions 240 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage the generation of hypercubes according to instructions 240 of one or more applications (e.g., software applications) stored in memory 230 of controller 110.

In addition to instructions 240, in some examples gathered or predetermined data or techniques or the like as used by processor 220 to manage the generation of hypercubes may be stored within memory 230. For example, memory 230 may include information described above that may be stored in database 120, and/or may include substantially all of database 120. For example, as depicted in FIG. 4, memory 230 may include hypercube data 232, which includes variable data 234. Hypercube data 232 and variable data 234 may include historical hypercubes and all the associated variables and associate data points, including their respective relationships as described above. Variable data 234 may also include features that are associated with each historical variable, and/or whether variables were collapsible and explodable and, if so, if the variables were predominantly collapsed or exploded as viewed by a user.

Memory 230 may include NLP techniques 236 that controller 110 may use to identify features of variables by analyzing documentation relating to variables or analyzing the characters and context of the variables themselves. NLP techniques can include, but are not limited to, semantic similarity, syntactic analysis, and ontological matching. For example, in some embodiments, processor 220 may be configured to parse comments from product documentation or the like in repositories 140 to determine semantic features (e.g., word meanings, repeated words, keywords, etc.) and/or syntactic features (e.g., word structure, location of semantic features in headings, title, etc.) of product literature that are associated with the variables. Ontological matching could be used to map semantic and/or syntactic features to a particular concept. The concept can then be used to determine the subject matter. In this way, using NLP techniques, controller 110 may, e.g., identify a full set of features of variables in order to improve an ability of controller 110 identifying historical variables that correlate to the instant variables.

Memory 230 may also include preference and threshold data 242. Preference and threshold data 242 may include one or more thresholds that indicate that a historical variable correlates an instant variable in a given assignment. In some examples, preference and threshold data 242 may include preferences or thresholds that are unique to some users. For example, preference and threshold data 242 may include an indication that a first user prefers to be presented with a single hypercube (e.g., such that controller 110 may generate and present the hypercube with the single highest score), while a second user prefers to be presented with a plurality of hypercubes (e.g., such that controller 110 generates and presents every hypercube that satisfies a minimum weighted grade threshold), or the like.

Memory 230 may further include machine learning techniques 244 that controller 110 may use to improve a process of hypercube generation over time. Machine learning model 244 can comprise algorithms or models that are generated by performing supervised, unsupervised, or semi-supervised training on a dataset, and subsequently applying the generated algorithm or model to generate hypercubes according to preference and threshold data 242.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 5:
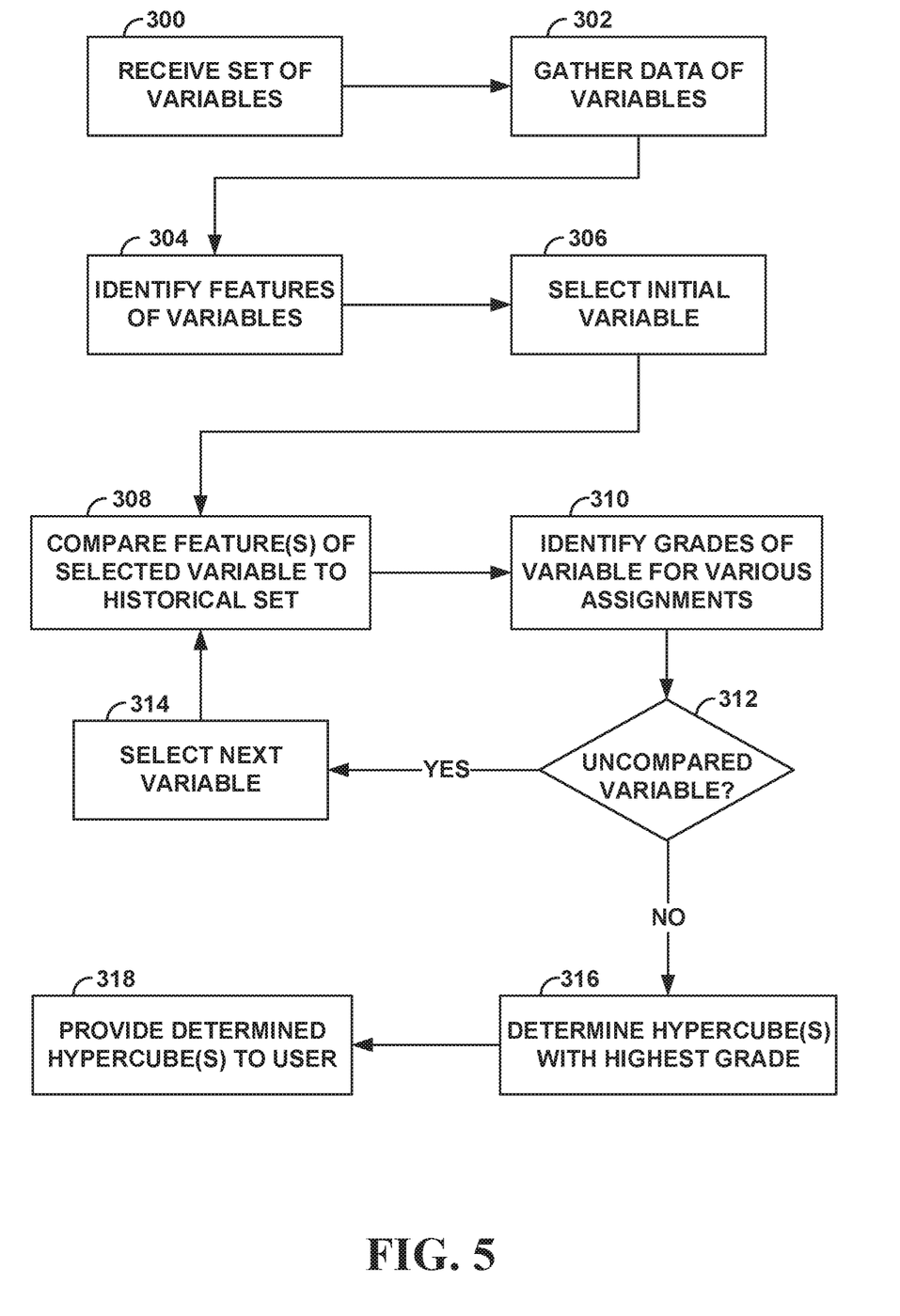
FIG. 5 depicts an example flowchart of managing the generation of hypercubes.

Using these components, controller 110 may manage the generation of hypercubes as discussed herein. For example, controller 110 may manage the generation of hypercubes according to the flowchart depicted in FIG. 5. The flowchart of FIG. 5 is discussed with relation to FIG. 1 for purposes of illustration, though it is to be understood that other systems may be used to execute the flowchart of FIG. 5 in other examples. Further, in some examples controller 110 may execute a different method than the flowchart of FIG. 5, or controller 110 may execute a similar method with more or less steps in a different order, or the like.

Controller 110 may receive a set of variables (300). Controller 110 may receive these variables from user devices 130. Each of these variables may have one or more associated arrays of data that are ordered or structured. For example, each data point of the array of the variables may have an order from first to last and may moreover be associated with at least one other variable of the set of variables.

Controller 110 may gather data of the variables (302). The data may include metadata on the features, or data from repositories 140, or the like. Using this data, controller 110 may identify features of the variables (304). Each variable may have at least one feature that is associated with it. The features may define or characterize the variables. Each variable may have a unique set of features that is associated with it.

Controller 110 may select an initial variable (306) and compare features of this selected variable to historical features of historical variables (308). Historical variables may be variables of historical hypercubes that were previously generated and used by users. In some examples, these historical hypercubes may be stored in database 120. In certain examples, each historical hypercube may be individually picked as a sufficient template by a trained user. In other examples, many or all hypercubes ever created by an organization that is associated with the user sending the variables may be stored in database 120.

Controller 110 may identify weighted grades of the selected variable for various assignments (310). For example, controller 110 may identify a weighted grade of the selected variable in a first column, and in a second column, and in a first row, and in a second row, and nested as a depth variable, and nested as a collapsed variable in the first column, etc. Controller 110 may identify unique weighted grades for each of these assigned positions.

Controller 110 may determine weighted grades by identifying a strength of a correlation between the selected variable and various historical variables. For example, controller 110 may identify an assignment that is identical to a historical assignment of a historical variable of a historical hypercube that has a 90% match to the selected variable. Further controller 110 may identify that this historical hypercube is identified in database 120 as an excellent hypercube that was curated by a master hypercube generator. As such, controller 110 may determine that this assignment has a grade of 9.5 out of 10. For another example, controller 110 may identify that another potential assignment that is identical to a different assignment of a second historical variable has a 95% match to the selected variable, but is labeled as an average hypercube. As such, controller 110 may determine that this second assignment has a grade of 8 out of 10. Other types of grades that account for other factors are also possible.

Once controller 110 has determined weighted grades for some or all assignments of variable, controller 110 may determine if there are further variables to evaluate (312). If there are, controller 110 may select a next variable for analysis (314). In this way, controller 110 may execute a loop (e.g., operations 308, 310, 312, 314) until all variables are analyzed and grades for some or all assignments of each variable are determined.

Once controller 110 determines that all variables have been analyzed (at 312), controller 110 may determine one or more hypercubes with the highest grades (316). Controller 110 may determine the hypercubes with the highest grades by identifying which combination of assignments maximizes the weighted grades for all variables. Once one or more hypercubes are determined, controller 110 provides these hypercubes to the user (318). In some examples, controller 110 presents a plurality of different hypercube options to the user so that the user may select a preferred hypercube. Controller 110 may monitor for any modifications to the hypercube as executed by the user or by another user, therein updating grading algorithms as described herein. Further, controller 110 may upload the final hypercube and associated variables to database 120 as a historical hypercube once the user has finalized the hypercube.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, from a user, a plurality of variables;
autonomously identifying intrinsic features of variables of the plurality of variables; and
generating, autonomously and using the features, a new hypercube data structure that includes a plurality of two-dimensional array of cells that are stacked on top of each other by assigning:
a first set of variables of the plurality of variables as one or more row variables of the hypercube;
a second set of variables of the plurality of variables as one or more column variables of the hypercube; and
a variable of the plurality of variables as a nested variable of the hypercube, wherein the nested variable only has a single value represented on any single two-dimensional array of cells of the plurality of two-dimensional array of cells.

2. The computer-implemented method of claim 1, wherein the features include a category of the variables, and using the features includes identifying whether a historical usage of the category is associated with the one or more row variables or the one or more column variables or a depth variable.

3. The computer-implemented method of claim 1, wherein the hypercube is a first hypercube, further comprising generating a second hypercube data structure by assigning:
   a third set of variables of the plurality of variables as one or more row variables of the second hypercube;
   a fourth set of variables of the plurality of variables as one or more column variables of the second hypercube; and
   a variable of the plurality of variables as a depth variable of the second hypercube.

4. The computer-implemented method of claim 3, further comprising presenting both the first hypercube and the second hypercube to the user.

5. The computer-implemented method of claim 1, wherein assigning the first set of variables as the one more row variables and assigning the second set of variables as the one or more column variables further comprises:
   identifying that at least one feature of the first set of variables matches a historical feature of a historical set of row variables of a historical hypercube; and
   identifying that at least one feature of the second set of variables matches a historical feature of a historical set of column variables of the same historical hypercube,
   wherein the first set of variables is assigned as the one or more row variables in response to the at least one feature of the first set of variables matching the historical feature of row variables, and
   wherein the second set of variables is assigned as the one or more column variables in response to the at least one feature of the second set of variables matching the historical feature of column variables.

6. The computer-implemented method of claim 1, further comprising identifying, using the features, that a variable of the plurality of variables is collapsible.

7. The computer-implemented method of claim 6, wherein generating the new hypercube includes determining to collapse the collapsible variable.

8. The computer-implemented method of claim 1, wherein generating the new hypercube includes:
   identifying, using the features, a first column width for a first column of the one or more columns;
   identifying, using the features, a second column width for a second column of the one or more columns;
   identifying, using the features, a first row height for a first row of the one or more rows; and
   identifying, using the features, a second row height for a second row of the one or more rows, wherein the first column width is different than the second column width and the first row height is different than the second row height.

9. The computer-implemented method of claim 8, wherein identifying the first column width includes identifying that a historical hypercube that includes a historical variable similar to a variable of the first column defined the first column width.

10. A system comprising:
    a processor; and
    a memory in communication with the processor, the memory containing instructions that, when executed by the processor, cause the processor to:
    receive, from a user, a plurality of variables;
    autonomously identify intrinsic features of variables of the plurality of variables; and
    generate, autonomously and using the features, a new hypercube data structure that includes a plurality of two-dimensional array of cells that are stacked on top of each other by assigning:
       a first set of variables of the plurality of variables as one or more row variables of the hypercube;
       a second set of variables of the plurality of variables as one or more column variables of the hypercube; and
       a variable of the plurality of variables as a nested variable of the hypercube, wherein the nested variable only has a single value represented on any single two-dimensional array of cells of the plurality of two-dimensional array of cells.

11. The system of claim 10, wherein the features include a category of the variables, and using the variables includes identifying whether a historical usage of the category is associated with the one or more row variables or the one or more column variables or the depth variable.

12. The system of claim 10, the memory further containing instructions that, when executed by the processor, cause the processor to identify, using the features, that a variable of the plurality of variables is collapsible.

13. The system of claim 12, wherein generating the new hypercube includes determining to collapse the collapsible variable.

14. The system of claim 10, wherein the hypercube is a first hypercube, the memory further containing instructions that, when executed by the processor, cause the processor to generate a second hypercube data structure by assigning:
    a third set of variables of the plurality of variables as one or more row variables of the second hypercube;
    a fourth set of variables of the plurality of variables as one or more column variables of the second hypercube; and
    a variable of the plurality of variables as the depth variable of the second hypercube.

15. The system of claim 14, the memory further containing instructions that, when executed by the processor, cause the processor to present both the first hypercube and the second hypercube to the user.

16. The system of claim 10, wherein generating the new hypercube includes:
    identifying, using the features, a first column width for a first column of the one or more columns;
    identifying, using the features, a second column width for a second column of the one or more columns;
    identifying, using the features, a first row height for a first row of the one or more rows; and
    identifying, using the features, a second row height for a second row of the one or more rows, wherein the first column width is different than the second column width and the first row height is different than the second row height.

17. The system of claim 16, wherein identifying the first column width includes identifying that a historical hypercube that includes a historical variable similar to a variable of the first column defined the first column width.

18. A computer program product, the computer program product comprising a computer readable storage medium having program instructions embodied therewith, the program instructions executable by a computer to cause the computer to:

receive, from a user, a plurality of variables;

autonomously identify intrinsic features of variables of the plurality of variables; and generate, autonomously and using the features, a new hypercube data structure that includes a plurality of two-dimensional array of cells that are stacked on top of each other by assigning:

a first set of variables of the plurality of variables as one or more row variables of the hypercube;

a second set of variables of the plurality of variables as one or more column variables of the hypercube; and a variable of the plurality of variables as a nested variable of the hypercube, wherein the nested variable only has a single value represented on any single two-dimensional array of cells of the plurality of two-dimensional array of cells.

19. The computer program product of claim 18, wherein the features include a category of the variables, and using the variables includes identifying whether a historical usage of the category is associated with the one or more row variables or the one or more column variables or the depth variable.

20. The computer program product of claim 18, wherein the hypercube is a first hypercube, the computer readable storage medium having additional instructions embodied therewith that, when exceed by the computer, cause the computer to:

generate a second hypercube data structure by assigning:

a third set of variables of the plurality of variables as one or more row variables of the second hypercube;

a fourth set of variables of the plurality of variables as one or more column variables of the second hypercube; and a variable of the plurality of variables as the depth variable of the second hypercube; and present both the first hypercube and the second hypercube to the user.

* * * * *